Patented Aug. 4, 1942

2,292,255

UNITED STATES PATENT OFFICE 2,292,255

PROCESS OF ROASTING COFFEE

Mark Weisberg, Providence, R. I.

No Drawing. Application November 4, 1940,
Serial No. 364,295

6 Claims. (Cl. 99—68)

The object of my invention is to provide a process for roasting coffee whereby the disadvantages inherent in the roasting of coffee beans by means of gas burners or eliminated. It is more particularly an object of my invention to provide a roasting process in which the coffee beans are exposed to infra-red rays and penetrating visible rays; that is, those light rays characterized by radiations the maximum proportion of which have by wave lengths of about 6,500 to about 16,000 Angstrom units.

There have been several methods of roasting coffee proposed wherein the source of heat is that of electrical heating units. These incandescent heat sources are dull red hot iron alloy electric heating elements. The use of light in the ultra-violent range of the spectrum has also been suggested for roasting coffee. But the radiations from iron alloy wires at 400°–500° F., or even at much higher temperatures, affect mainly the exposed surfaces of the beans since these radiations are not characterized by great penetrating ability.

When roasting coffee by processes now in use, employing gas as the heating medium, it is usually necessary to over-roast or burn the outside of each bean slightly in order to properly roast the interior of the bean. This type of procedure yields a bean, therefore, in which much of the flavor and aroma originally present near the surface of the bean has been sacrificed in order to develop, as much as possible, the flavor in the interior of the bean.

When coffee beans are roasted by infra-red rays, however, it is not necessary to compromise in this manner between the interior and exterior of the bean.

By virtue of the penetrating properties of these rays, the center portion of the bean is roasted properly while the bean as a whole is given a less intense roast than is practicable with other roasting methods. This is important, particularly to hotels and restaurants, in that coffee beans made from such less intensely roasted beans not only have a great amount of flavor and aroma but also retain their flavor and aroma for long periods of time.

Another advantage to applicant's roasting process is that there is no possibility of the presence of foreign odors in the roasted coffee due to contamination by gases of combustion.

Furthermore the hot freshly roasted beans are often "quenched" by water baths when using present-day processes. This step removes much of the coffee's natural flavor and aroma. In the employment of infra-red roasting, this is unnecessary.

In my improved method of roasting coffee, the distinctive feature which characterizes my invention is the employment of light rays of about 6,500 to about 16,000 Angstrom units in length to roast the beans by exposing the beans to these penetrating rays. This aforesaid exposure may be used alone or in conjunction with other methods. It may comprise the sole step of the process or it may be only one of a series of two or more steps. Various types of apparatus may be used to bring the raw or pre-treated beans into the path of these penetrating infra-red rays. Cylindrically-shaped units may be used but no rigid standard of construction need be followed. When cylindrical units are used the lamps can be arranged around the inner circumference of the unit. It is well, in order to secure high efficiency, to have highly polished surfaces, resistant to the developed gases and heat, in the rear of each lamp bulb. Gold-plated reflectors can be used for this purpose. Other of the arrangements are flat or tunnel style installations. The lamps can conveniently be nested and placed within a good working distance from the material.

Various deviations can be made in the installations and I contemplate various flexible operating conditions in my invention of applying infra-red rays to the process of roasting coffee.

The coffee beans may be roasted under vacuum, or the beans may be roasted under pressure. Then too, the roasting may be done in an inert atmosphere, such as nitrogen or carbon dioxide. The operation of infra-red roasting equipment is quite flexible, and the actual operating conditions may be varied at will.

The time and temperature of the roasting operation may be varied according to the blend of coffee being roasted and according to the market outlet for which the coffee is intended. Definite temperatures of operation cannot be assigned in the way of limitations. But in general, the roasting should be performed at temperatures between 100° C. and 1000° C. The length of time required for roasting cannot be put within fixed limits, as this will depend upon the temperatures employed, the type of roast desired, i. e., "light," "medium," "full," "French," etc. and many other factors.

Carbon filament lamps, because the maximum radiation therefrom has wave lengths of 6,500–16,000 Angstrom units, can be advantageously used. But this is not the only source of radiation available. The use of infra-red rays for the roasting of coffee, no matter what their source, falls within the scope of my invention.

I wish, particularly, to call attention to the fact that in addition to the above enumerated advantages of using infra-red rays in the roasting of coffee, a uniform even roast is obtained throughout the cross-section of the bean. This is of great importance and all coffee roasting methods strive toward this end. By virtue of the well-known penetrating properties of infra-red rays, the green coffee beans are actually roasted from "the inside out," and there is no necessity of slightly over-roasting the exterior of the beans in order to develop fully the flavor in the interior.

The process may be further understood from examples, which are, however, presented merely for the purpose of illustrating the application of the present invention, and not for the purpose of restricting the scope of the invention, since numerous changes may be made therein without departing from the spirit and scope thereof. They are also not intended, because of the small quantities of materials specified, to, in any sense, impose limitations as to successful operation on a small scale. Designs of commercial equipment can be put into service for large scale output.

EXAMPLE I 150 grams of green coffee beans, a blend of the Mocha and Java types, was placed in a cylinder having dimensions of 4" length x 3" diameter, and made of copper screen. The cylinder was placed so that its axis was 5 inches below an infra-red bulb. This bulb was a 1000 w. 105–120 volt Westinghouse infra-red drying bulb, and was housed in a Fostoria reflector. The cylinder was rotated at a speed of 40 R. P. M. for 14 minutes thereby exposing the beans uniformly to the radiations. At the end of this period the electric current feeding the infra-red lamp was cut off. The beans were then continually agitated while they cooled down to room temperature. 130 grams of uniformly "full-roasted" beans were obtained.

EXAMPLE II

The roasting procedure described in Example I was duplicated except that 75 grams of green beans were charged into the roasting cylinder and the beans were exposed to the radiations for 11½ minutes. 65.5 grams of lightly roasted beans were obtained.

TESTS

A

Coffee brews were prepared from each of the coffee bean roasts prepared in Examples I and II, and also from commercially gas-roasted beans of the same Mocha-Java blend used in Examples I and II, according to the following procedure:

| | |
|---|---|
| Equipment used | Standard 6 cup household vacuum type coffee-maker. |
| Amount of coffee (freshly ground to a fine grind) | 30 grams. |
| Amount of tap water | 400 c. c. |

In each of the three extractions, an electric hot plate was used as the heating element and electric current was allowed to pass through the coils of the plate 10 minutes before the charged vacuum vessel was placed in position.

Records of the brewing operations:

| Time | |
|---|---|
| 4½ min | Water in the lower vessel of the vacuum apparatus starts to boil. |
| 7 min | Electric current through hot plate is cut off. |
| 12½ min | Coffee extract is sucked down into lower vessel. |

OBSERVATIONS
Coffee samples

| | 14 min. infra-red roast | 11½ min. infra-red roast | Gas roast |
|---|---|---|---|
| Appearance of brew when viewed by reflected light. | Med. brown color. | Light brown color. | Dark brown color. |

200 c. c. of each of three brews prepared in the tests was placed in each of three 400 c. c. beakers and stirred at 80 to 85° C. for 15 minutes, then allowed to cool to room temperature.

Two hours after this period of heating, the brews were warmed to 50° C. No definite odor of staleness could be detected in any of the three brews, but the two brews prepared from the infra-red roasts possessed decidedly more aroma than the third brew. The brew prepared from the 11½ minute roasts was most aromatic.

TESTS

B

Roasted infra-red coffee beans were stored in a sealed container. In a separate vessel, gas roasted beans were kept under like conditions. At two and at four week intervals, the containers were opened and brews made from the respective lots according to conventional methods. The brews made from infra-red roasts showed better retention of aroma and flavor; and there was no staleness detectable.

I claim:

1. In the process of roasting coffee beans the step of exposing the coffee beans to radiations, the major portion of which have wave lengths between 6,500 and 16,000 Angstrom units.

2. The process set out in claim 1 wherein the coffee roasting temperature employed is between 100° and 1000° C.

3. The process set out in claim 1 wherein the beans are held under vacuum.

4. The process set out in claim 1 wherein the beans are held under pressure.

5. The process set out in claim 1 wherein the operation is conducted in the presence of an inert gas.

6. In the process of roasting coffee beans the step of exposing the coffee beans to radiations from an electrically heated element the major portion of which have wave lengths between about 6,500 and about 16,000 Angstrom units.

MARK WEISBERG.